(12) United States Patent
Salour et al.

(10) Patent No.: US 10,439,956 B1
(45) Date of Patent: Oct. 8, 2019

(54) NETWORK PATH SELECTION FOR ROUTING DATA

(71) Applicant: 8x8, Inc., San Jose, CA (US)

(72) Inventors: Mehdi Salour, San Jose, CA (US); Raghu Rengarajan, San Jose, CA (US)

(73) Assignee: 8×8, Inc., San Jose, CA (US)

( * ) Notice: Subject to any disclaimer, the term of this patent is extended or adjusted under 35 U.S.C. 154(b) by 334 days.

(21) Appl. No.: 15/191,115

(22) Filed: Jun. 23, 2016

(51) Int. Cl.
| | | |
|---|---|---|
| G06F 15/173 | (2006.01) |
| H04L 12/911 | (2013.01) |
| H04L 12/26 | (2006.01) |
| H04L 12/66 | (2006.01) |
| H04L 29/08 | (2006.01) |

(52) U.S. Cl.
CPC .............. *H04L 47/70* (2013.01); *H04L 12/66* (2013.01); *H04L 43/08* (2013.01); *H04L 67/1004* (2013.01)

(58) Field of Classification Search
CPC ......... H04L 47/70; H04L 12/66; H04L 43/08; H04L 67/1004
USPC ........................................................ 709/226
See application file for complete search history.

(56) References Cited

U.S. PATENT DOCUMENTS

| | | | | |
|---|---|---|---|---|
| 7,586,899 B1 * | 9/2009 | Mohaban | .......... | H04L 29/06027 370/352 |
| 7,995,464 B1 * | 8/2011 | Croak | ................. | H04L 41/5009 370/218 |
| 8,228,818 B2 * | 7/2012 | Chase | ..................... | H04L 43/12 370/232 |
| 8,401,003 B1 | 3/2013 | Petit-Huguenin et al. | | |
| 8,422,986 B1 | 4/2013 | Martin et al. | | |
| 8,873,568 B2 * | 10/2014 | Hiie | ........................ | H04L 45/00 370/400 |
| 8,879,540 B1 | 11/2014 | Martin et al. | | |
| 8,891,367 B2 * | 11/2014 | Cho | .................. | H04W 72/1236 370/230 |
| 9,116,223 B1 | 8/2015 | Martin et al. | | |
| 9,154,589 B1 * | 10/2015 | Klein | .................... | H04L 69/329 |
| 9,203,652 B2 | 12/2015 | Petit-Hugue | | |
| 9,247,389 B2 | 1/2016 | Martin et al. | | |
| 9,906,985 B2 * | 2/2018 | Stephenne | ............ | H04W 28/24 |
| 2018/0136979 A1 * | 5/2018 | Morris | ................ | H04L 67/1097 |

\* cited by examiner

*Primary Examiner* — Kristie D Shingles
(74) *Attorney, Agent, or Firm* — Crawford Maunu PLLC

(57) ABSTRACT

Apparatus and methods concerning routing of data in a network disclosed. In an example embodiment, an apparatus includes a network interface circuit connected to a network via a plurality of network paths. A circuit arrangement is connected to the network interface circuit and is configured to provide the one or more services for endpoints in the network by 1) communicating data with the endpoints via the network interface, 2) estimating respective qualities of service provided to the endpoints by each of the plurality of network paths, 3) selecting a subset of the plurality of network paths for routing data from the endpoints to the apparatus, and 4) prompting one or more nodes in the network to route data to the apparatus using the selected subset of the plurality of network paths. Paths may be selected for example, to address one or more quality metrics, security/compliance, and/or balance server load.

21 Claims, 5 Drawing Sheets

NETWORK PATH SELECTION FOR ROUTING DATA

OVERVIEW

The instant disclosure relates generally to communication of data in a data network and, more particularly to communication of data between a computing server and a plurality of endpoints in a network via multiple network paths (e.g., access points and/or service providers). As used herein, an "endpoint device" (or "endpoint") refers to an apparatus having a communication circuit (or network interface circuit) configured and arranged to communicate with a computing server and/or other endpoints via a network. A "computing server" refers to an apparatus having a network communication circuit and configured to provide one or more remote services for endpoints in the network. Computing servers are increasingly being used to provide various services to network devices over a data network. The provided services may include, for example, data storage, remote computing services, website hosting, virtual computing environments, home automation, media streaming service (e.g., on-demand music and/or video), telecommunication services (e.g., cellular communication, voice-over-IP, video-conferencing), or various combinations thereof. For ease of reference, the various applications, systems, and services that may be provided by computing servers may be collectively referred to as remote services. A computing server may comprise a single server or may comprise multiple distributed servers operating together (e.g., cloud-based services) to provide services to the network devices.

Certain portions of the instant disclosure more particularly relate to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), Session Initiation Protocol (SIP), packet-based systems, digital wireless systems, analog wireless systems, private branch exchanges (PBX), cable systems, T1 systems, integrated service digital networks (ISDN), and digital subscriber line (DSL) systems, to name a few.

SUMMARY

Various example embodiments are directed to issues such as those addressed above and/or others which may become apparent from the following disclosure concerning providing of services over data networks. In certain example embodiments, aspects of the present disclosure involve selection of network paths for routing data to and/or from a plurality of endpoints in a network.

In a more specific example embodiment, an apparatus includes a network interface circuit connected to a network via a plurality of network paths and configured to communicate data over the network via the plurality of network paths. A circuit arrangement connected to the network interface circuit is configured and arranged to provide one or more communication services for a plurality of endpoints in the network. The circuit arrangement provides the communication service by 1) communicating data with the plurality of endpoints via the network interface, 2) estimating respective qualities of service provided to the plurality of endpoints by each of the plurality of network paths, 3) selecting a subset of the plurality of network paths for routing data from the plurality of endpoints to the apparatus, and 4) prompting one or more nodes in the network to route data to the apparatus using the selected subset of the plurality of network paths.

In another specific example embodiment, a method is provided for providing one or more services to a plurality of endpoints in a network. At a computing server, connected to a network via a plurality of network paths, quality of service provided to the endpoints by the network paths is estimated. A subset of the plurality of network paths is selected for routing data from the plurality of endpoints to the computing server. One or more nodes in the network are prompted to route data to the computing server using the selected subset of the plurality of network paths. One or more services are provided to a set of endpoints in a network via the network.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
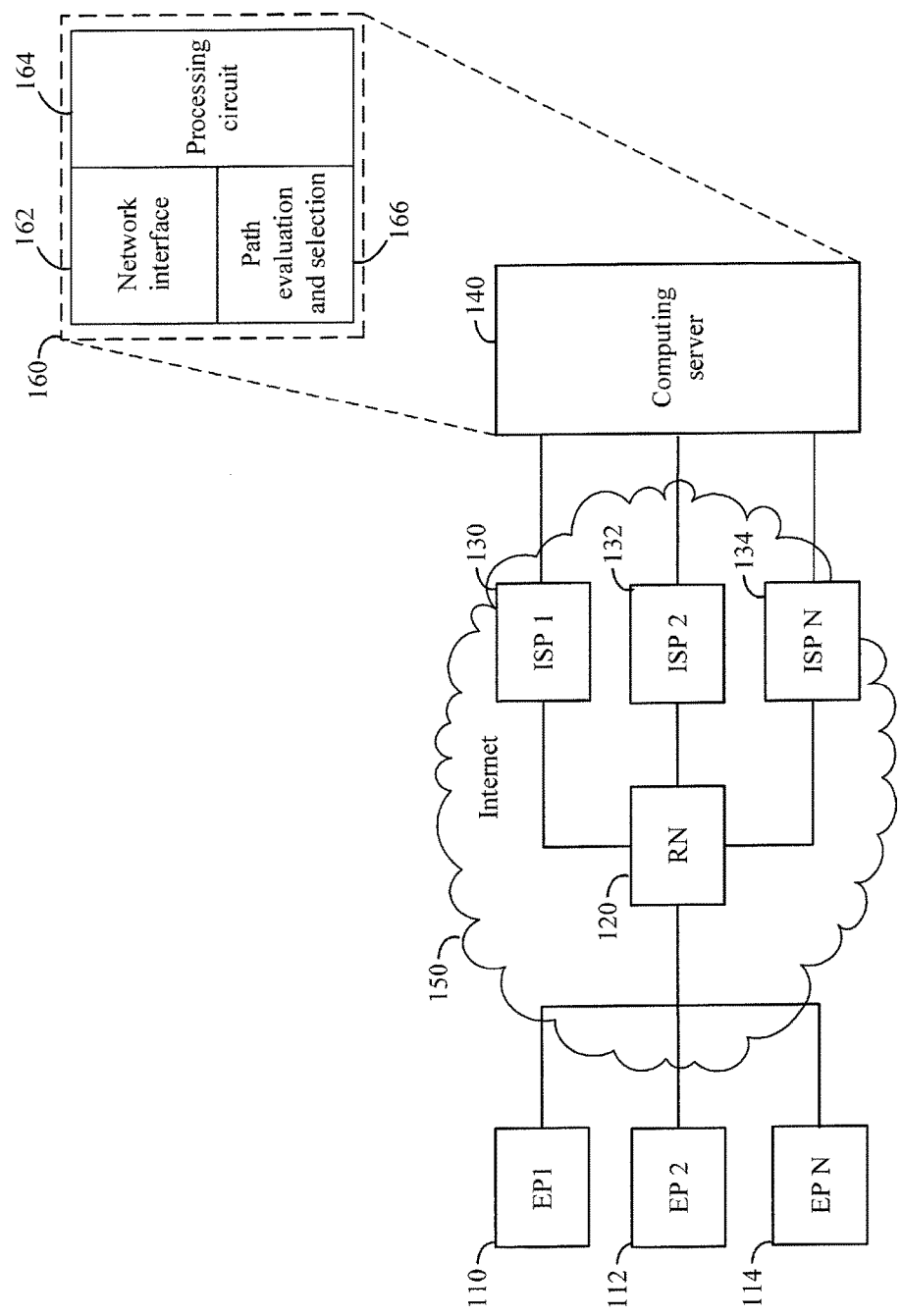
FIG. 1 shows a communication network, configured in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, including systems and/or devices, and methods involving providing remote services for a plurality of endpoints in a network. Some example implementations are directed to apparatuses and methods for selection of network paths for routing data to and/or from a computing server configured to provide one or more remote services for a plurality of endpoints. While not necessarily so limited, various aspects may be appreciated through the following discussion of non-limiting examples in this context.

In certain embodiments, a computing server is configured to provide one or more services to a plurality of endpoints in a network. The computing server is connected to the network via a plurality of network paths. The quality of service provided by each network path may differ for each endpoint. For instance, one network path may provide the best service for a first endpoint and a different network path may provide the best service for another endpoint. The computing service selects a subset of the network paths for routing data between the plurality of endpoints and the computing server based on quality of service provided to the endpoints by the network paths. The computing server configures one or more network communication devices (e.g., network interfaces, routing nodes, and/or endpoints), in the network to route data using the selected data path(s).

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. In addition, although aspects and features may in some cases be described in individual figures, it will be appreciated that features from one figure can be combined with features of another figure even though the combination is not explicitly shown or explicitly described as a combination.

In different embodiments, a computing server may use various processes for selecting network paths used to route data communicated from endpoints to the computing server. For ease of reference, data communicated from the endpoints to the computing server may be referred to as ingress data. In certain embodiments, the computing server is configured to select a network path for routing ingress data based on the quality of service provided to the respective endpoints by the network paths. For example, the computer server may select a network path that provides the highest level of quality of service for a majority of the endpoints. For instance, the computer server may determine the average level of quality of service provided by each network path $$\frac{\text{summed quality of service levels for all endpoints}}{\text{number of endpoints}}$$

The computer server may then select the network path having the highest average level of quality of service. As another example, the computer server may select a network path that provides the highest level of quality of service for all of the endpoints. The computing server may configure one or more devices in the network to route ingress data to the computer server using the selected path.

The computing server may additionally and alternatively select network paths for routing data communicated from the computing server to endpoints. For ease of reference, data communicated from the computing server to endpoints may be referred to as egress data. In some embodiments, network paths for routing egress data may be selected using a different process than that used to select a network path for routing of ingress data. For instance, one network path may be selected for routing ingress data for all endpoints while network paths for routing egress may be respectively selected on an endpoint-by-endpoint basis.

In some embodiments, network paths for ingress and/or egress data may be selected based on various parameters in addition to or in lieu of the quality of service provided by the network paths. Other parameters may include, for example, geographic location of the endpoints and/or computing server, type of data to be communicated (e.g., text, images, webpage, voice/audio, and/or video), traffic load of the computing server, time and/or date, or various combinations thereof. Values of the quality of service and/or other parameters may be determined by the computing server, endpoints, and/or various nodes in the network (e.g., routing nodes). Alternatively or additionally, the values of the parameters may be retrieved from one or more other data sources including, for example, internet-connected data repositories, and/or third-party data subscription services. For ease of explanation, examples are primarily described with reference to selection of network paths based on quality of service provided by the network paths.

Quality of service provided by a network path may be determined using various processes and/or circuits. In some embodiments, a computing server may include a circuit configured to determine transmission characteristics via analysis of network traffic communicated via the network paths. The quality of service may be based on various characteristics of the received data that are indicative of channel conditions. The quality of service provided by a particular network path may be determined, for example, by evaluating data packets received via the network path for a number of parameters including, for example, dropped packets, out of order packets, bit error rate, header metadata, jitter, or various combinations thereof. As an illustrative example, quality of service may be determined by: 1) examining headers of the data packets received via the network path to identify dropped and out of order data packets; 2) examining error detection and/or correction data to identify data packets in error; 3) performing forward-error-correction (FEC) to determine bit error rate; and 4) examining time stamp data to determine jitter and/or latency of the received data packets. In some implementations, the quality of service may be passively determined from traffic communicated via the network path during normal operation. Additionally or alternatively, the computing server may initiate communication of data to facilitate assessment of transmission characteristics. For instance, the computing server may ping endpoints to evaluate latency of different network paths. Other evaluation processes that may be used to determine the post-transmission quality state may include various other operations in addition to or in lieu of the operations indicated in the above examples.

In different embodiments, a computing server may use various processes to cause data to be routed over the select path(s). In some implementations, the server may control routing of data by selecting from a plurality of internet service providers to communicate the data over the public network. Additionally or alternatively, the server may control routing by prepending autonomous system (AS) path length entries (e.g., AS_PATH attributed of the Border Gateway Protocol) provided to routing nodes connected to the server in the public network. Prepending may cause a routing node to believe a connection between the node and the server includes a larger number of network hops than the actual number of hops. By prepending entries provided to certain routing nodes, network paths used to route data from the endpoint to the server can be manipulated.

Conversely, in some embodiments, the server may cause an endpoint, access point or other device in the network to prepend routing table entries to manipulate network paths used for routing data from the server to the endpoint. For example, an endpoint may be able to connect to the public network via multiple types of connections (e.g., DSL, cable, fiber, and/or satellite) and/or by multiple internet service providers. The computing server may direct the endpoint to use a particular one of the network paths, selected by the computing server, to communicate data from the endpoint to the computing server.

In some embodiments, a data network may include multiple computing servers configured to provide a remote service for the endpoints. For instance, a VoIP service provider may have multiple computing servers geographically distributed in a network for providing VoIP service to endpoints. As previously indicated, in some embodiments, a computing server may select one network path for routing egress data to all of the endpoints. However, it is recognized that the selected network path may not provide the best quality of service for all of the endpoints.

In some embodiments, a first computing server may evaluate connections for one or more endpoints to determine if a currently selected network path to a second computer server provides better quality of service for the endpoints. If a selected network path for a second computer server provides better quality of service, the first computing server may direct the endpoint to contact the second server for service.

In some embodiments, network paths may be selected according to a selection algorithm specified in a configuration settings file. The configuration settings file may be stored locally or in a remote database. The selection algorithm may select network paths based on various criteria including geographic location of the endpoints, type of data to be transmitted, security and compliance criteria (e.g. data sovereignty, avoiding routes thorough certain countries, avoiding certain untrusted Internet Service Providers (ISPs), etc.), characteristics of quality of service (e.g., bandwidth, latency, dropped data packets, BER, and/or traffic load), date, time, or various combinations thereof.

In some implementations, the algorithms/criteria for selection of network paths may be implemented using one or more machine learning algorithms (e.g., an evolutionary algorithm). The machine learning algorithm may be evaluated and adjusted in a training process to improve performance and/or accuracy of the algorithm. Training may include supervised or unsupervised learning. In some embodiments, a network path selection algorithm may be adjusted to use a different weighting of parameters on a trial basis. If the modified network path selection algorithm improves performance in the network(s), the modified settings selection algorithm may replace the current settings selection algorithm. Otherwise, the modified settings selection algorithm may be discarded.

The disclosed embodiments may be adapted to facilitate intelligent routing for various types of communication of various types of data. While embodiments are not so limited, for ease of explanation, the examples are primarily described with reference to servers configured to provide VoIP services for endpoints.

In some embodiments, the computing server may include a processing circuit configured to determine data metrics for data routed to and/or from the endpoints. The data metrics may be determined, for example, by generating various statistics relating to the quality of the VoIP calls including, for example, types of service provided to the endpoints, network path(s) used for routing of the data, and/or network characteristics of the network path(s) (e.g., bandwidth, latency, dropped data packets, and/or BER), or various combinations thereof. The processing circuit may be configured to generate reports indicating data metrics for individual transactions or sessions of the endpoints, or aggregate data for all activity of the endpoints.

In some embodiments, the processing circuit is configured to perform an analysis of the data metrics. For instance, the processing circuit may evaluate the generated data metrics for a parameter of interest specified in an input query. The input query may request that the processing circuit analyze the data metrics for various parameters of interest. Parameters of interest may include, for example, identifiers for specific ones of the data metrics and/or criteria for identifying subsets of the data metrics. As an illustrative example, an input query may request that the processing circuit filter data metrics to identify metrics common to transactions and/or sessions having a determined quality that is below a threshold specified in the query. After identifying the common metrics, the values may be used as a signature to identify similar calls as they occur. This process may be useful, for example, to determine a signature for detection of network paths that are congested. The signature may then be used in the future, for example, to select network paths to avoid congestion.

As yet another example parameter of interest, the input query may request that a processing circuit identify data metrics that are exhibiting a recent trend in comparison to a historical average value. Trends may be identified, for instance, based on deviation of a value of the data metric in a recent time window from an average calculated from the previous time window. In some implementations, the analysis process may further evaluate identified trends to identify other metrics that exhibit a strong correlation with the identified trend. In some embodiments, a processing circuit is configured to correlate data metrics with data provided from other sources to facilitate further analysis. Other data sources may include, for example, applications utilized by the end-users in the network, internet-connected data repositories, and/or third-party data subscription services. As one example, a presence (or activity) detection circuit may provide data indicating statuses of the end-users to the processing circuit.

In some implementations, the processing circuit may be configured to provide alert messages to one or more users in response to the data metrics or analysis satisfying a set of alert criteria. For example, in some embodiments, an alert may be provided to a network administrator in response to quality of service provided by an available network path falling below a predetermined threshold value. In response, the network administrator may allocate additional network paths that may be selected by the computing server for communication with the endpoints.

In some embodiments, the processing circuit may additionally or alternatively be configured to provide a graphical user interface (GUI), e.g., a webpage interface, including a mechanism (e.g., button(s), selection menu(s), and/or slider(s)) for the user to define/adjust network paths available for selection, criteria for evaluating quality of server, criteria for selection of network paths for routing ingress and/or egress data, and/or criteria for generating alerts.

Turning now to the figures, FIG. 1 shows a communication network, configured in accordance with one or more embodiments. The communication network includes a computing server 140 (e.g., VoIP servers) configured to provide one or more services for endpoints 110, 112, and 114 connected to a data network 150 (e.g., the internet). The computing server is connected to the data network 150 via a plurality of network paths (e.g., internet service providers 130, 132, and 134).

The computing server 140 selects a subset of the network paths 130, 132, and 134 for routing data from the plurality of endpoints to the computing server based on quality of service provided to the endpoints by the network paths. The computing server 140 configures one or more network devices (e.g., routing node 120 and/or endpoints 110, 112, and 114) to route ingress traffic to the computing server 140 using the selected data path. As previously explained, the network devices may be prompted to route ingress data via a particular data path(s) by prepending routing data exchanged to other devices on the network 130.

In different embodiments, the computing server 140 may include various different circuit arrangements to provide service(s) and/or control routing of data via the data network 150 as described with reference to the above described processes. Block 160 shows an example circuit that may be used to implement the computing server 140 in some embodiments. The example circuit 160 includes at least one network interface circuit 162 configured to communicate data over the data network 150. In different embodiments, the network interface circuit 162 may be configured to communicate data over the data network according to various communication protocols including, but not limited to Ethernet, WiFi, CDMA, GSM, Bluetooth, ZWave, Zigbee, and/or various IEEE 802.X protocols.

The example circuit 160 also includes a circuit arrangement 164 and 166 configured to provide one or more services for endpoints 110, 112, and 114 via the network interface 162 by 1) communicating data with the plurality of endpoints via the network interface, 2) estimating respective qualities of service provided to the plurality of endpoints by each of the plurality of network paths, 3) selecting a subset of the plurality of network paths for routing data from the plurality of endpoints to the apparatus, and 4) prompting one or more nodes in the network to route data to the apparatus using the selected subset of the plurality of network paths.

A processing circuit 164 of the circuit arrangement is configured to communicate data with the endpoints 110, 112, and 114, via the network interface 162 and the data network 150, for providing the one or more services. The circuit arrangement also includes a path evaluation and selection circuit 166 coupled to the network interface 162. The path evaluation and selection circuit 166 is configured to evaluate quality of service provided by the plurality of paths in the network. As previously described, the paths may be selected based on various parameters including characteristics indicative of quality of service (e.g., bandwidth, latency, dropped data packets, BER), security and compliance criteria (e.g. data sovereignty, avoiding routes thorough certain countries, avoiding certain untrusted Internet Service Providers (ISPs), etc.), traffic load of the computer servers, the type of data to be communicated (e.g., text, images, webpage, voice/audio, and/or video), or various combinations thereof. The parameters may be measured directly by the computing server 140 or provided to the computing server by one or more devices communicatively connected to the data network 150 including, for example, the endpoint 110, 112, 114, the routing node 120, the ISPs 130, 132, and 134, or by third party service. In addition to selection of network paths, the circuit 164 may select communication settings (transmission protocols, encryption, forward error correction, and/or audio or video codec), or various combinations thereof.

Figure 2:
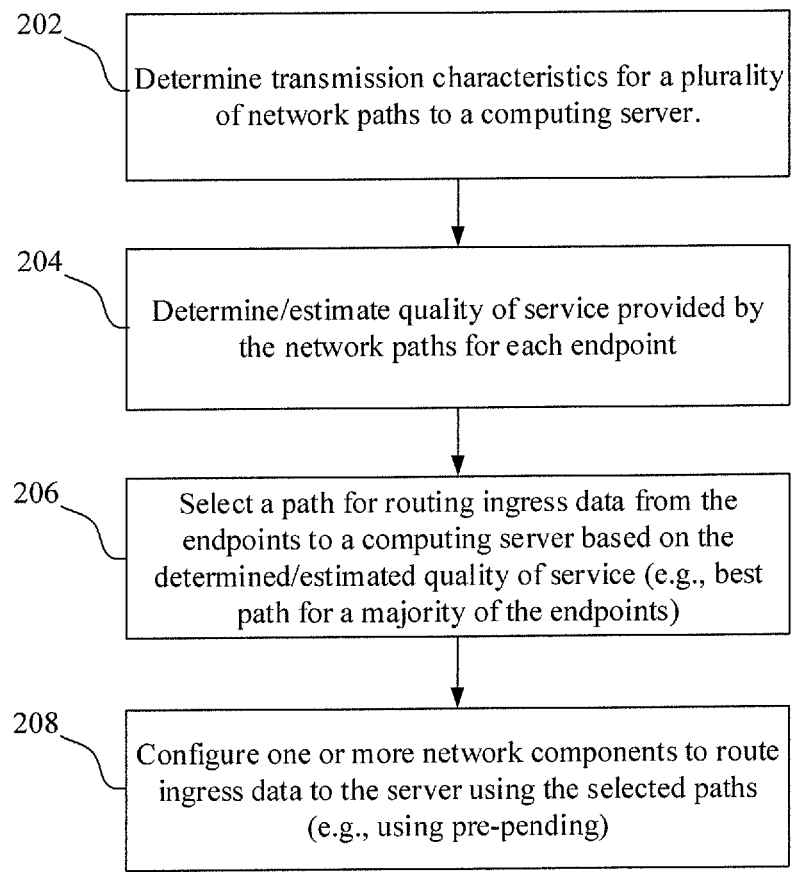
FIG. 2 shows an example process for selecting network paths for routing ingress data in a network, in accordance with one or more embodiments.

FIG. 2 shows an example process for selecting network paths for routing ingress data in a network, in accordance with one or more embodiments. At block 202, transmission characteristics are determined for a plurality of network paths between endpoints and a computing server. At block 204 a quality of service provided by the network paths is determined or estimated for each endpoint, for example, as previously described.

At block 206, a network path is selected for routing ingress data from the endpoints to the computing server. As previously indicated, different embodiments may select network paths using various processes. Example 1 shows pseudocode for one example process for selecting a network path for communicating ingress data from endpoints to the computing server. In this example, the pseudocode determines a network path that provides the best quality of service for the most endpoints. A quality of service is quantified for each combination of a network path and endpoint. The qualities of service are summed for each network path to provide a respective total quality of service. The network path having the highest total quality of service is determined and returned.

```
select_network_path ( ){
  int_total_quality_of_service [ ];
  int_selected_path;
  for each network path (pd) of the set of selectable network
    paths {
    for each endpoint e {
      total_quality_of_service[dp]=total_quality_of_ser-
        vice[dp]+
      quality_of_service (e);
    }
  }
  selected_path=highest(total_quality_of_service [pd]);
  return selected_path;
}
```

Example 1

Example 2 shows pseudocode for another example process for selecting a network path for communicating ingress data from endpoints to the computing server. In this example, the pseudocode determines a network path that provides a threshold level of quality of service for the most endpoints. A quality of service is quantified for each combination of a network path and endpoint. For each network path, a number of endpoints that are provided a quality of service greater than a threshold value is determined. The network path providing the threshold quality of service for the most endpoints is determined and returned.

```
select_network_path ( ){
  int #endpoint_w_sat_QOS [ ];
  for each network path (pd) of the set of selectable network paths {
    for each endpoint e {
      if (quality_of_service (e) > threshold)
        #endpoint_w_sat_QOS [pd]++
    }
  }
  selected_path = highest(#endpoint_w_sat_QOS [pd]);
  return selected_path;
}
```

Example 2

At block 208, one or more network devices are configured to route ingress data to the server using the selected paths.

The routing performed by the network components may be configured using various processes. For example, in some embodiments, one or more routing nodes in a network may be manipulated to use and/or avoid a particular network path by prepending routing data exchanged to other devices on the network. As another example, some end-points may be configured to select a particular path for routing of data to the computing server. For instance, an endpoint may have access to multiple access points (e.g., ISP connections) for connecting to the internet. The computing server may prompt the endpoint to use a selected one of access points to transmit data to the computing server.

Figure 3:
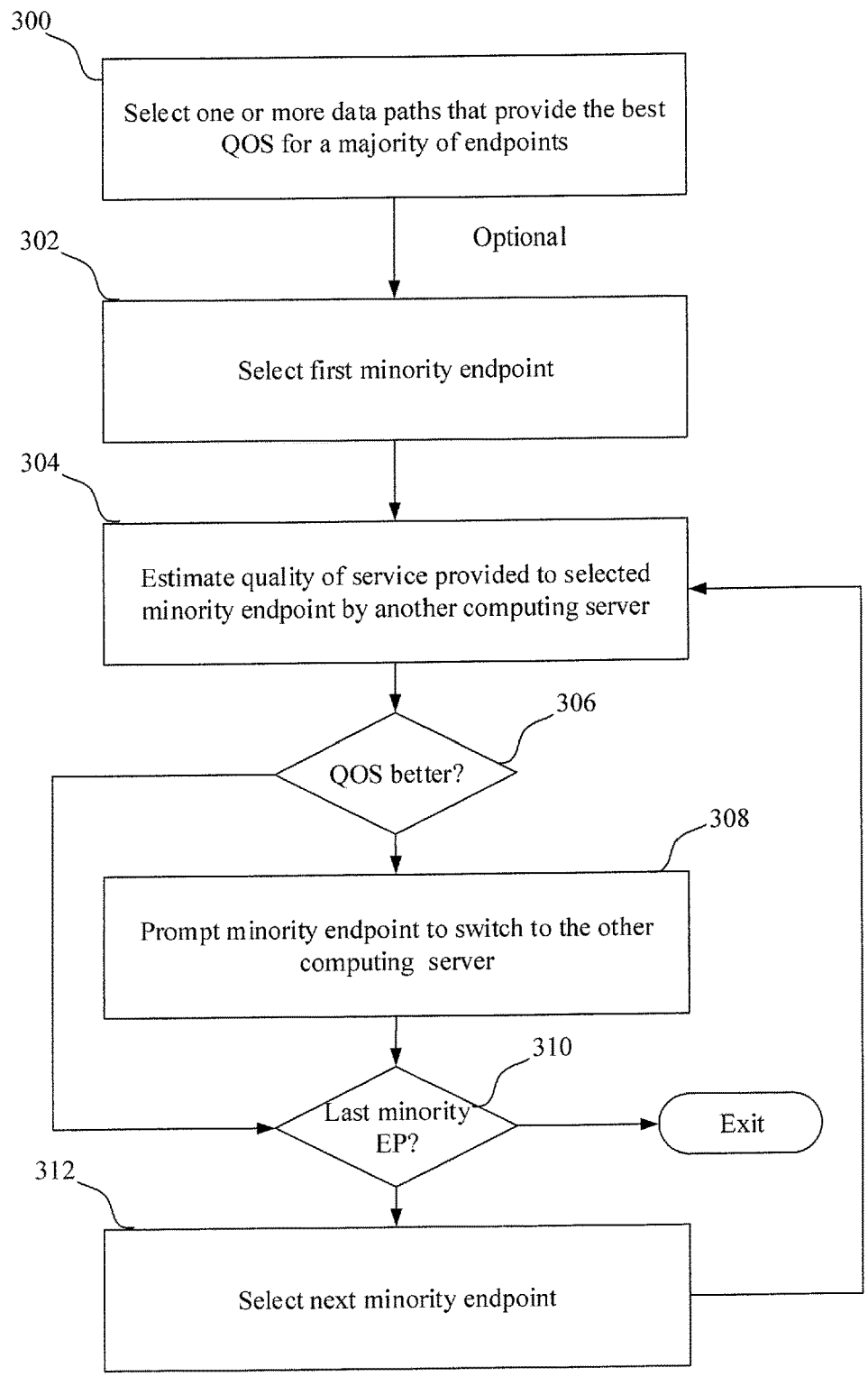
FIG. 3 shows an example process for selecting network paths for routing data in a network, in accordance with one or more embodiments.

In some embodiments, a computing server may be configured to the minority of endpoints for which the selected network path does not provide the best quality of service. FIG. 3 shows an example process for selecting network paths for routing data in a network, in accordance with one or more embodiments At block 300, one or more network paths are selected that provide the best quality of service for a majority of the endpoints, for example, as described with reference to FIG. 2. For ease of reference, endpoints that are not included in the majority may be referred to as the minority. At blocks 302-312, the process evaluates alternate quality of service provided by one or more alternate computing servers for endpoints in the minority. At block 302, a first endpoint of the minority is selected. At block 304, quality of service provided to the selected endpoint by another computing server is estimated. If the quality of service provided by the alternate computing server is better than that provided by the path selected at block 302, the process proceeds from decision block 306 to block 308. At block 308, the selected endpoint is prompted to switch to the other service provider. If the quality of service provided by the alternate computing server is worse than that provided by the path selected at block 302, the process bypasses block 308 and proceeds to decision block 310. While the selected endpoint is not the last endpoint of the minority, at decision block 310, the process selects the next endpoint at block 312. The process than proceeds back to block 304, wherein the evaluation is repeated for the new selected endpoint.

Figure 4:
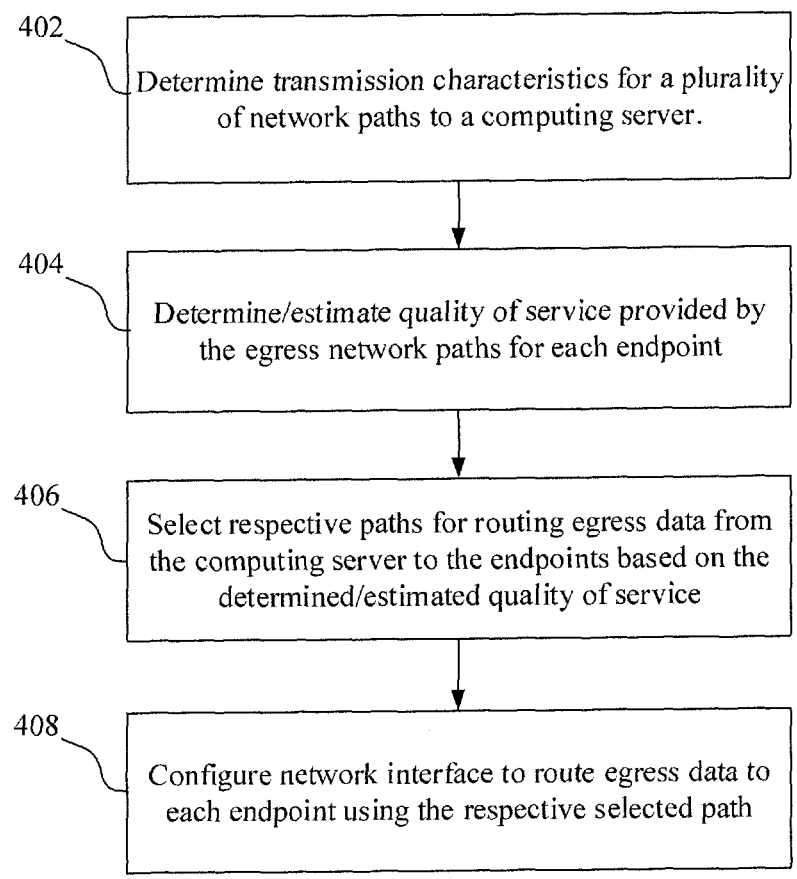
FIG. 4 shows an example process for selecting network paths for routing egress data in a network, in accordance with one or more embodiments.

FIG. 4 shows an example process for selecting network paths for routing egress data in a network, in accordance with one or more embodiments. At block 402, transmission characteristics are determined for a plurality of network paths from a computing server to a plurality of endpoints. At block 404 a quality of service provided by the network paths is determined or estimated for each endpoint. At block 406, respective paths are selected for routing ingress data from the computing server the respective endpoints. At block 408, a network interface of the computing server is configured to route egress data to each endpoint using the respective selected path.

Figure 5:
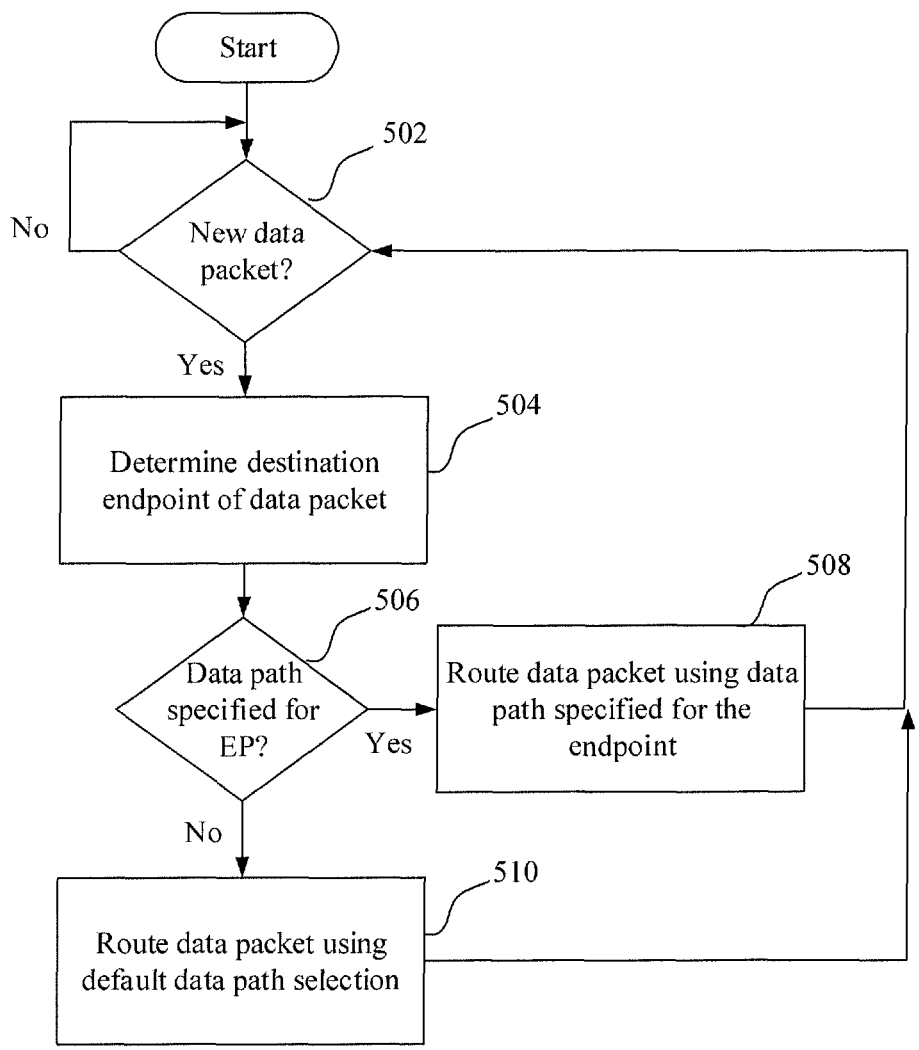
FIG. 5 shows an example process for communicating data to endpoints in a network, in accordance with one or more embodiments.

FIG. 5 shows an example process for communicating data to endpoints in a network, in accordance with one or more embodiments. The process waits at decision block 502 until a new data packet is ready for transmission to an endpoint. When a new data packet is ready for transmission, a destination endpoint of the data packet is determined at block 504. If no network path is specified for the determined endpoint, the process proceeds from decision block 506 to block 510. At block 510, the data packet is routed using a default network path selection. For instance, a default selection algorithm may select paths having the least cost or select paths to balance load across the plurality of network paths. If a network path is specified for the determined endpoint, the process proceeds from decision block 506 to block 508. At block 508, the data packet is routed using the network path specified for the endpoint.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, an "endpoint device" (or "endpoint") refers to an apparatus having a communication circuit that can include processing circuits which are configured to establish communication sessions (e.g., VoIP communication sessions) with other devices (e.g., personal computers, IP-enabled mobile phones, and tablet computers) in a data network. In certain embodiments, such a processing circuit is one or more computer circuits programmed to execute a set (or sets) of instructions (and/or configuration data). The instructions (and/or configuration data) can be in the form of firmware or software stored in and accessible from a memory (circuit), where such circuits are directly associated with one or more algorithms (or processes). The activities pertaining to such algorithms are not limited to the specific flows shown in the flow charts illustrated in the figures (e.g., where a circuit is programmed to perform the related steps, functions, operations, activities, etc.). The flow charts are merely specific detailed examples. The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored instructions which may be executed by a computer (or other electronic device) to perform these operations/activities. For example, these instructions reflect activities or data flows as may be exemplified in the flow chart. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus, comprising:
   a network interface circuit communicatively connected to a network via a plurality of network paths and configured and arranged to communicate data via the plurality of network paths; and
   a circuit arrangement connected to the network interface circuit and configured and arranged to provide one or more communication services for a plurality of endpoints in the network by
      communicating data with the plurality of endpoints via the network interface circuit,
      estimating respective qualities of service provided to the plurality of endpoints by each of the plurality of network paths,
      selecting a subset of the plurality of network paths for routing data from the plurality of endpoints to the apparatus,
      prompting one or more nodes in the network to route data to the apparatus using the selected subset of the plurality of network paths, and
      selecting a first subset of network paths for routing data from the plurality of endpoints to a computing server and selecting a different subset of the plurality of network paths for routing data from the computing server to the plurality of endpoints.

2. The apparatus of claim 1, wherein the circuit arrangement is configured and arranged to, in selecting of the subset of the plurality of network paths,
   for each of the plurality of endpoints, determine which one of the plurality of network paths provides the highest level of quality of service for the endpoint by evaluating generated data metrics for data routed between the plurality of endpoints, and
   select the one of the plurality of network paths that provides the highest level of quality of service for communication of data to the apparatus for the largest number of the plurality of endpoints.

3. The apparatus of claim 1, wherein the circuit arrangement is configured and arranged to, in selecting of the subset of the plurality of network paths,
   determine, for each of the plurality of network paths, an average quality of service provided to the plurality of endpoints by the network path, and
   select the one of the plurality of network paths that provides the highest of the determined average quality of services.

4. The apparatus of claim 1, wherein the circuit arrangement is configured and arranged to prompt the one or more nodes in the network to route data to the apparatus using the selected subset of the plurality of network paths by prepending autonomous system (AS) path length information provided to one or more network nodes via the plurality of network paths that are not included in the selected subset.

5. The apparatus of claim 4, wherein the AS path length information exchanged on the network is according to a border gateway protocol.

6. The apparatus of claim 1, wherein the circuit arrangement is configured and arranged to, in estimating of the quality of service provided to the plurality of endpoints, ping the endpoints.

7. The apparatus of claim 1, wherein the circuit arrangement is configured and arranged to, in estimating of the quality of service provided to the plurality of endpoints by one of the plurality of network paths, determine a latency of the path, number of dropped packets, bit-error-rate, signal-to-noise ratio, bandwidth, jitter, congestion level or a combination thereof.

8. The apparatus of claim 1, further comprising:
   a second server; and
   wherein the circuit arrangement is configured and arranged to, for at least one of the plurality of endpoints for which the selected subset of the network paths do not provide the highest level of quality of service, prompt the endpoint to contact the second server for service in response to determining that the second server can provide better quality of service to the endpoint than the network paths in the selected subset.

9. The apparatus of claim 1, wherein the circuit arrangement is configured and arranged to select the network paths of the plurality of network paths for routing data from the apparatus to the plurality of endpoints.

10. The apparatus of claim 1, wherein the circuit arrangement is configured to, for each of the plurality of endpoints
    select a respective one of the plurality of network paths that provides the highest level of quality of service for routing data from the apparatus to the endpoint, and
    configure the network interface circuit to route data from the apparatus to the endpoint via the selected network path.

11. The apparatus of claim 1, wherein the plurality of network paths includes a first network path provided by a first internet service provider and a second network path provided by a second internet service provider.

12. A method, comprising at a computing server connected to a network via a plurality of network paths:
    estimating respective qualities of service provided to a plurality of endpoints by each of the plurality of network paths;
    selecting a subset of the plurality of network paths for routing data between the plurality of endpoints and the computing server;
    prompting one or more nodes in the network to route data between the computing server and the plurality of endpoints using the selected subset of the plurality of network paths;
    providing one or more services to a set of endpoints in a network via the network; and
    selecting a first subset of network paths for routing data from the plurality of endpoints to the computing server and selecting a different subset of the plurality of network paths for routing data from the computing server to the plurality of endpoints.

13. The method of claim 12, wherein the selecting of the subset of the plurality of network paths includes,
    for each of the plurality of endpoints, determining which one of the plurality of network paths provides the highest level of quality of service for the endpoint, and
    selecting the one of the plurality of network paths that provides the highest level of quality of service for communication of data to the computing server for the largest number of the plurality of endpoints.

14. The method of claim 12, wherein selecting the subset of the plurality of network paths includes, determining, for each of the plurality of network paths, an average quality of service provided to the plurality of endpoints by the network path, and selecting the one of the plurality of network paths that provides the highest level of the determined average quality of services.

15. The method of claim 12, wherein prompting one or more nodes in the network to route data to the computing server using the selected subset of the plurality of network paths includes prepending autonomous system (AS) path length information provided to one or more network nodes via the plurality of network paths that are not included in the selected subset according to a border gateway protocol.

16. The method of claim 12, wherein estimating the quality of service provided to the plurality of endpoints by one of the plurality of network paths includes determining a latency, number of dropped packets, bit-error-rate, signal-to-noise ratio, bandwidth, jitter, congestion level or a combination thereof.

17. The method of claim 12, further comprising, for at least one of the plurality of endpoints, for which one of the network paths that provides the highest level of quality of service is not included in the selected subset, prompting the endpoint to contact a second server connected to the network for service in response to determining that the second server can provide better quality of service to the endpoint than the network paths in the selected subset.

18. The method of claim 12, further comprising, for each of the plurality of endpoints, selecting a respective one of the plurality of network paths that provides the highest level of quality of service for routing data from the computing server to the endpoint, and configuring a network interface circuit of the computing server to route data from the computing server to the endpoint via the selected network path.

19. The method of claim 12, wherein the plurality of network paths includes a first network path provided by a first internet service provider and a second path provided by a second internet service provider.

20. The method of claim 12, wherein selecting the subset of the plurality of network paths includes, determining, for each of the plurality of network paths, an average quality of service provided to the plurality of endpoints by the network path.

21. The method of claim 12, further comprising, for each of the plurality of endpoints, selecting a respective one of the plurality of network paths that provides the highest level of quality of service for routing data from the computing server to one of the plurality of endpoints.

* * * * *